May 21, 1935.  M. LAMORT  2,002,404
PULP STRAINER
Filed Aug. 12, 1933
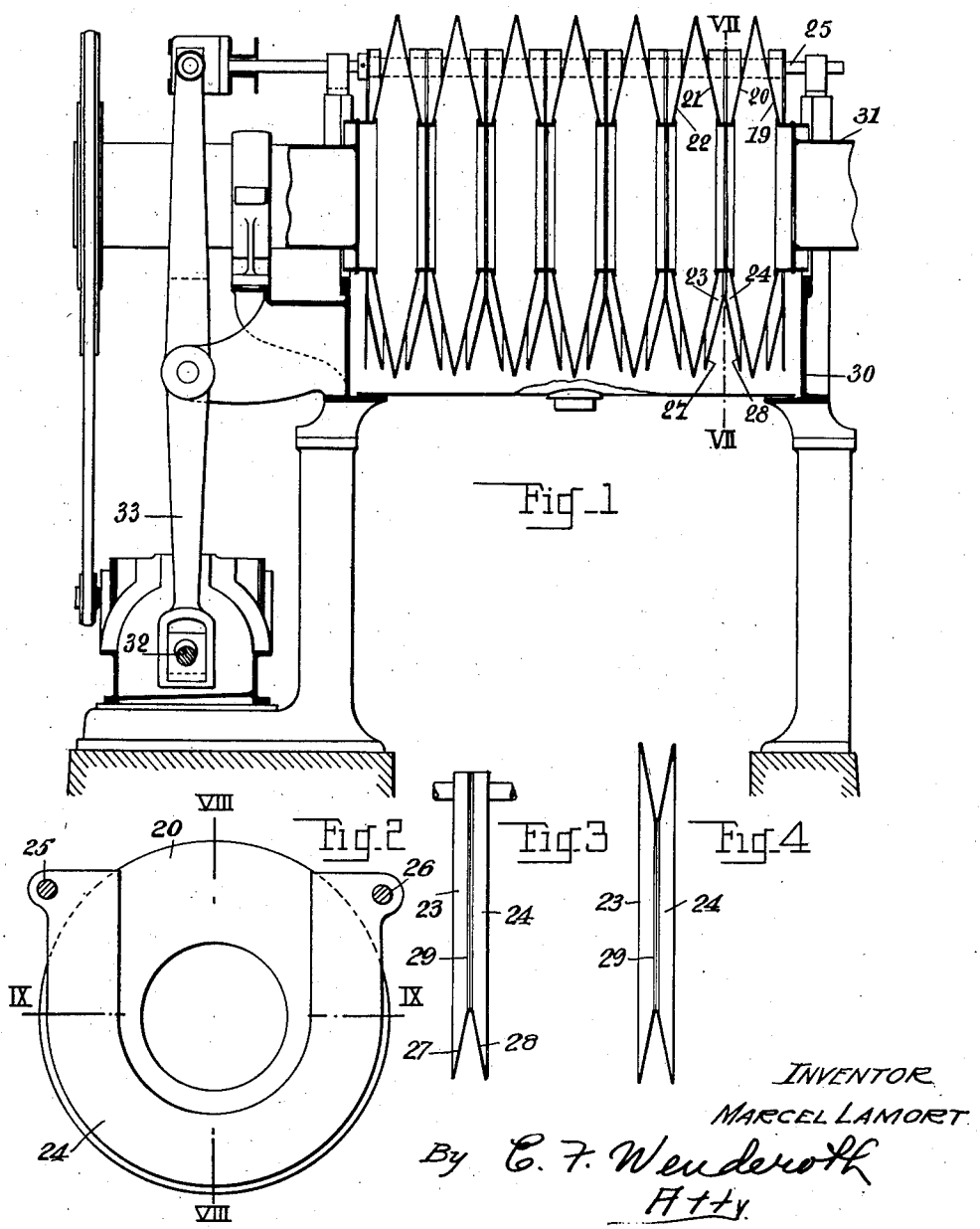
INVENTOR
MARCEL LAMORT
By C. F. Wenderoth
Atty.

Patented May 21, 1935

2,002,404

UNITED STATES PATENT OFFICE 2,002,404

PULP STRAINER

Marcel Lamort, Vitry-le-Francois, France, assignor to Etablissements E. & M. Lamort Fils, Vitry-le-Francois, France Application August 12, 1933, Serial No. 684,915
In France August 29, 1932

6 Claims. (Cl. 92—33)

The present invention relates to purifying apparatus for paper pulp, that is, to apparatus which retain the large particles contained in the pulp, and it has for its object an apparatus which affords a greater output than the known apparatus, and is of a more substantial construction.

The purifying apparatus in conformity to the invention comprises a vat for the pulp, a straining surface in zigzag position located in the said vat, and means for imparting to the said surface a reciprocating motion whose direction is oblique or perpendicular to the operative parts of the straining surface.

In one embodiment of the invention, the pulp to be treated is contained in a vat in which is located a straining surface in zigzag disposition, to which is imparted, by a suitable mechanism, a reciprocating motion whose direction is perpendicular or oblique to the operative parts of the straining surface.

For instance, the said vat may contain a frame in which are mounted suitable straining plates which are perpendicular or oblique to the plane of said frame. The frame is given a reciprocating motion parallel to its plane, thus producing pulsations of the liquid.

Such pulsations may also be produced by means of oscillating plates having a reciprocating motion adjacent the unit parts of the straining surface, the reciprocating motion being preferably in a direction which is practically perpendicular to the said units.

In one form of construction, the straining surface, which has the zigzag disposition or is corrugated, is mounted in a flat horizontal frame; the oscillating plates have a horizontal reciprocating motion between the straining units forming the zigzag device. In this manner the straining units may have a saw-tooth arrangement, and the oscillating plates are bent at an acute angle and are movable between the saw-teeth. The straining units may also be mounted in parallel rows, with the oscillating plates located between such rows. In another form of construction, the set of straining units are mounted in star shape, and the set of oscillating plates also have the form of a star which is coaxial with the former, and an arrangement may thus be used in which a smaller star-shaped device is mounted within the larger one; herein the two star-shaped devices have a slow and continuous rotation, and the internal device is further arranged for oscillations, in conformity to the invention.

In another form of construction, the strainers have the form of tapered washers located on a common axis and assembled at their bases, and thus the whole device has the form of a Chinese lantern. The lantern-shaped drum thus formed is given a rapid reciprocating motion parallel to its axis, and also a slow rotation on its axis. The drum may further have a fixed position, and pulsations may be imparted to the liquid by means of oscillating plates which will have preferably the form of flanges which are assembled in pairs at their small bases.

In the accompanying drawing:

Figure 1 is an elevational view of an apparatus having the form of a Chinese lantern.

Figure 2 is a cross section on the line VII—VII of Figure 1.

Figure 3 is a cross section of a strainer unit, on the line VIII—VIII of Figure 2.

Figure 4 is a section of said unit on a horizontal plane according to the line IX—IX of Figure 2.

Figures 1, 2, 3 and 4 relate to an apparatus in which the strainers 19 have a form corresponding to the outer surface of a very flat truncated cone. For greater convenience, several flat plates can be juxtaposed in order to form a truncated pyramid. Such members 19—20 are assembled in pairs on their large bases, and the pairs 19—20 and 21—22 are connected together at their small bases. The whole device is mounted on hollow journals, for rotary motion.

Between each pair of strainers is mounted a movable unit consisting of two sheet metal pieces 23—24 which have the form of flanges open at the top, and are joined together at their short edges 29. The said flanges are mounted upon rods 25—26, and their diverging edge portions 27—28 are parallel to the faces of the strainers 20—21.

The set of strainers, which forms a sort of Chinese lantern is given a continuous rotation at a slow rate about its axis. The pulp is supplied to the vat 30, and it passes through the strainers and then issues through the hollow journal 31. During this time, the eccentric 32 imparts a reciprocating motion to the oscillating members 23—24, by means of a lever 33 which actuates the rods 25—26. It will be noted that the operation is analogous to what takes place in the preceding apparatus.

Obviously, the oscillating members may be perforated or imperforate, and may be given all suitable shapes, such as flat, corrugated or the like.

Having now particularly described and ascertained the nature of my invention and in what manner the same is to be performed, I declare that what I claim is:

1. A straining apparatus for paper pulp comprising a tank for said pulp, a drum located in said tank having a periphery forming a straining surface, said periphery being formed of inclined rings assembled side by side at their bases, means causing an irregular alternating displacement between said pulp and said drum and means for rotating said drum about its axis.

2. A straining apparatus according to claim 1 in which means are provided for causing the relative movement between said pulp and said drum to take place in a direction parallel to the axis of said drum.

3. An apparatus in accordance with claim 1 in which plates in the form of inclined rings are positioned adjacent the straining surface and means giving said plates an alternating irregular movement.

4. A straining apparatus for paper pulp as set forth in claim 1 in which plates are provided in the form of inclined rings adjacent the straining surface and means giving said plates an alternating irregular movement in a direction parallel to the axis of said drum.

5. A straining apparatus as set forth in claim 1 in which plates are provided in the form of inclined rings adjacent the straining surface and said plates are shaped as small collars and assembled in pairs upon their small base.

6. A straining apparatus as set forth in claim 1 in which plates are provided in the form of inclined rings adjacent the straining surface and said plates are disposed parallel to the neighboring surfaces of the drum.

MARCEL LAMORT.